L. L. CASS.
GRAIN DRIER.
APPLICATION FILED FEB. 4, 1908.

923,137.

Patented June 1, 1909.

Witnesses,
A. J. Dalton
J. L. Bick.

Inventor,
L. L. Cass
By Emil H. Keller
Atty.

UNITED STATES PATENT OFFICE.

LORIN L. CASS, OF WESTON, OHIO.

GRAIN-DRIER.

No. 923,137.     Specification of Letters Patent.     Patented June 1, 1909.

Application filed February 4, 1908. Serial No. 414,186.

*To all whom it may concern:*

Be it known that I, LORIN L. CASS, citizen of the United States, residing at Weston, in the county of Wood and State of Ohio, have invented certain new and useful Improvements in Grain-Driers; and I do hereby declare the following to be a full, clear, and exact description of the invention, such as will enable others skilled in the art to which it appertains to make and use the same.

This invention relates to apparatus for drying and cooling grain and it embodies the novel construction and arrangement whereby the grain is initially heated and dried, after which it is cooled and the heat contained therein is transferred to the air to be again employed in drying, the object of the invention being to provide a simple apparatus capable of being operated with a maximum of economy and efficiency.

To this end the invention embodies two separated chambers, one a drying chamber and the other a cooling chamber, each provided with double perforated or foraminous walls which provide continuous passages for the grain, with means for drawing the air from one chamber and for discharging it into the other chamber, and means for heating the air.

Figure 1:
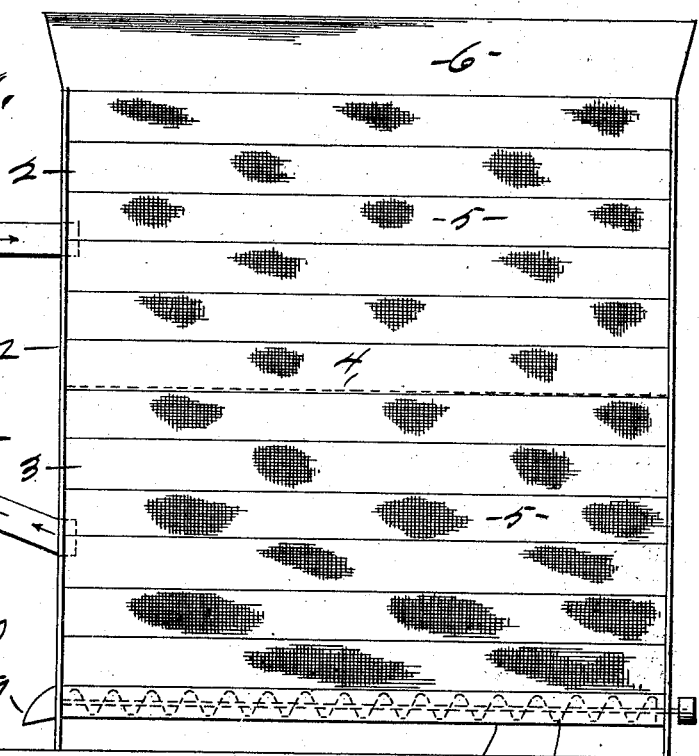
Figure 2:
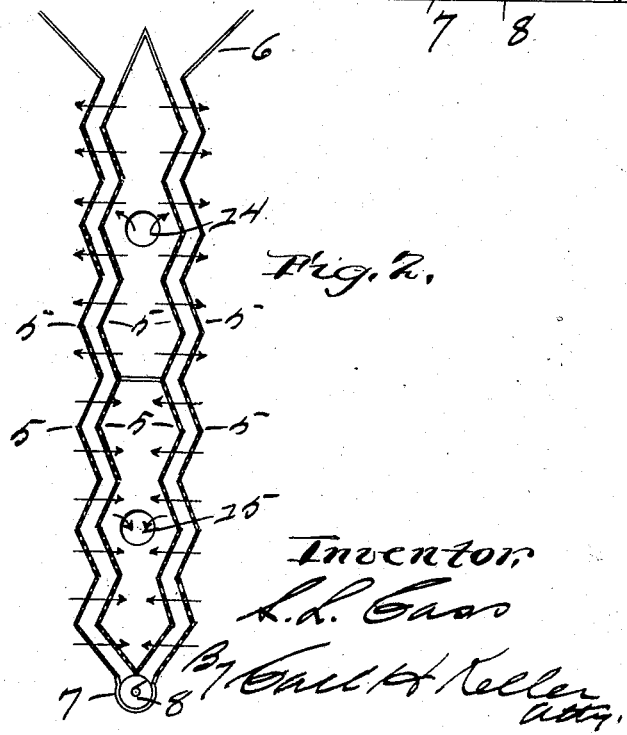

In the accompanying drawings, Figure 1 is an elevation showing the complete apparatus; Fig. 2 is a view showing diagrammatically the operation of the drier.

Referring to the drawings, 1 is the drier proper consisting of two superposed chambers 2 and 3, separated from direct connection with each other by a horizontal partition 4, the chamber 2 being the heating and drying chamber and 3 the cooling chamber. At the sides of the chambers 2 and 3 are double walls 5 of perforated or foraminous material and these walls are spaced apart and are successively inclined to provide passages through which the grain has a gradually descending movement in two divided columns from the receiving hopper 6 at the top of the drier to a trough 7 at the bottom, the grain being removed from the trough by any suitable means preferably a screw conveyer 8 discharging at 9.

10 is a heater through which air is drawn by a blower or fan 11 connected therewith by a flue 12 having a regulating slide 13 to control the passage of heated air therethrough, and 14 is a flue through which heated air is discharged from the fan into the drying chamber 2.

15 is a flue connecting the cooling chamber 3 with the hot air flue 12, the point of connection being between the fan and the regulating valve 13.

In operation, the fan being connected with suitable power and the heater being fired up preferably with anthracite coal, the grain to be dried is deposited into the hopper 6 from which it descends in two columns between the spaced perforated walls of the drying and the cooling chambers to the trough 7, the passage of the grain being continuous and the speed with which it descends depending upon the discharge at 9. The air from the heater being drawn directly through the burning coal will be highly heated and will follow the course indicated by the arrows, being discharged into the heating chamber and passing outward through the perforated walls thereof and through the grain, as indicated by the arrows, the grain being consequently dried. As the grain is constantly descending between the double perforated walls, when it arrives at a point opposite the partition 4 and thereafter as it descends below this point, the cold outer air will pass in an inward direction through the grain, as indicated by the arrows, Fig. 2. The grain will be consequently cooled and the air passing therethrough will take up the heat which it contained and pass through the flue 15 and into the fan. The grain is thus rapidly cooled and the heat again utilized.

To regulate the quantity of heated air taken from the heater the slide 13 is provided in the flue leading from the heater to the fan, and it will be seen that by regulating this slide the volume of heated air may be controlled. By slightly closing the slide, less heat will pass from the heater to the fan and a greater volume of air will be drawn through the grain between the double walls of the cooling chamber; and if the slide is opened, a greater volume of heated air will pass to the fan from the heater and the volume of air from the cooling chamber will be less.

From the foregoing it will be observed that the air is drawn through and discharged through a single column only of grain and since the heat absorbed by the grain is again transferred to the air employed in drying the grain, a minimum of both heat and mechanical energy will be required to operate the apparatus. Furthermore the operation of the apparatus is continuous, so that large quantities of grain may be dried and cooled at a very trifling expenditure for labor.

Having described my invention, what I claim and desire to secure by Letters Patent, is—

In an apparatus for cooling and drying grain, a drier having a hopper at the top, a trough at the bottom, and spaced perforated side walls providing connecting passages between the hopper and the trough, the spaced walls inclosing superposed chambers, the upper chamber a heating chamber and the lower a cooling chamber separated from direct connection with each other, a heater, a divided connection leading from the heater and the cooling chamber respectively to the intake of a fan, a fan, and a discharge connection from the fan to the heating chamber, substantially as described.

In testimony whereof, I hereunto affix my signature, in presence of two witnesses.

LORIN L. CASS.

Witnesses:
J. J. CRANDALL,
CARL H. KELLER.